United States Patent [19]
Glomski

[11] Patent Number: 5,427,446
[45] Date of Patent: Jun. 27, 1995

[54] SOUND RECORDING STORAGE CABINET

[76] Inventor: Graham R. Glomski, 44705 Albert Dr., Plymouth, Mich. 48170

[21] Appl. No.: 115,647

[22] Filed: Sep. 3, 1993

[51] Int. Cl.$^6$ ............................................. A47B 67/02
[52] U.S. Cl. ..................... 312/242; 411/482; 220/533; 220/544; 220/549; 206/387.15; 312/9.47; 312/351; 312/348.3
[58] Field of Search ...................... 312/242, 9.47, 9.48, 312/351, 348.3, 265.6, 108; 211/187; 206/387, 387.1, 387.14, 387.15, 334; 411/482, 401, 400, 919; 220/533, 544, 549

[56] References Cited

U.S. PATENT DOCUMENTS

| | | | |
|---|---|---|---|
| 570,338 | 10/1896 | Reed | 211/184 X |
| 1,046,488 | 12/1912 | Pavley | 312/351 X |
| 1,743,273 | 1/1930 | Hammer | 312/242 |
| 1,748,234 | 2/1930 | Loeb | 312/242 X |
| 1,833,081 | 11/1931 | Kilmer | 312/348.3 X |
| 2,112,498 | 3/1938 | Lax | 312/351 X |
| 2,439,664 | 4/1948 | Marchand | 312/242 |
| 3,244,289 | 4/1966 | King | 220/533 X |
| 3,306,689 | 2/1967 | Isaacson et al. | 312/351 X |
| 3,412,846 | 11/1968 | Spadaro | 220/533 X |
| 3,710,900 | 11/1973 | Fink | 206/387.15 |
| 4,223,787 | 9/1980 | Lowry et al. | 206/387.15 |
| 4,446,966 | 5/1984 | Moloney | 206/334 |
| 4,453,785 | 6/1984 | Smith | 312/9.48 |
| 4,753,343 | 6/1988 | Flynn | 312/297 X |
| 4,781,423 | 11/1988 | Muenzer et al. | 206/387 X |

FOREIGN PATENT DOCUMENTS 2653269 6/1978 Germany .......................... 206/334

Primary Examiner—Kenneth J. Dorner
Assistant Examiner—Janet M. Wilkens
Attorney, Agent, or Firm—Charles W. Chandler

[57] ABSTRACT

A convertible storage cabinet for storing audio tapes, video tapes, and compact discs, is adapted to be installed in a residential wall. The cabinet has a width suited for being inserted between a pair of vertical wall studs in the wall. The cabinet box has interior walls slotted to receive horizontal shelves for accommodating either video tapes or audio cassette tapes depending upon the location of the shelves; or a pair of vertical shelves that have inclined ribs for receiving compact discs.

8 Claims, 2 Drawing Sheets

SOUND RECORDING STORAGE CABINET

BACKGROUND OF THE INVENTION

Many people use modern sound recording equipment such as audio and video cassette equipment and compact disc equipment. A storage problem frequently arises because audio and video cassette tapes, and compact discs have different sizes and because of their number. Some storage containers are available for storing a specific type of cassette tape or disc. In addition to having a limited use, such containers cannot be conveniently stored in the residence.

SUMMARY OF THE INVENTION

The broad purpose of the present invention is to provide a sound recording storage cabinet that can be easily installed in a residential wall. The cabinet is a molded plastic unit having interchangeable vertical and horizontal shelves which provide storage for either video cassette tapes, audio cassette tapes or compact discs. The unit fits between the wall studs of modern residential dwellings. It has the proper depth to fit flush against a finished wall.

After the unit has been installed in the wall, vertical or horizontal shelves are inserted in the unit depending on the nature of the tapes or discs being stored. Some tapes can be stored with other objects by inserting horizontal flat shelves with the ribbed shelves that receive the tapes. Double-headed screw fasteners secure the unit to the wall and a door to the unit.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
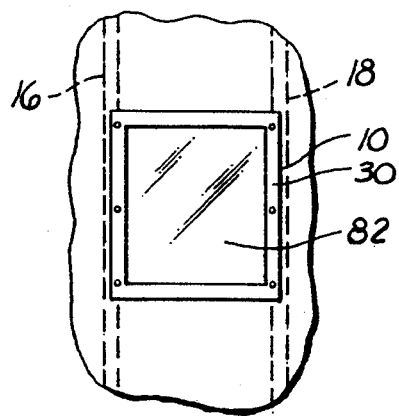
FIG. 1 illustrates a convertible storage cabinet mounted in a wall in accordance with the invention.
Figure 2:
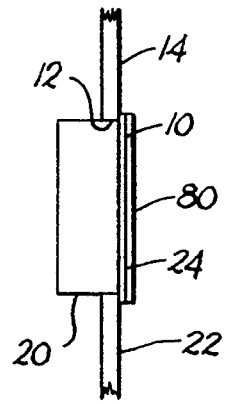
FIG. 2 is a sectional view illustrating how the cabinet is mounted flush with the finished wall.

Referring to the drawings, FIGS. 1 and 2 illustrate a convertible storage cabinet 10 mounted in a rectangular opening 12 of a residential wall 14. The cabinet has a width permitting it to be mounted between conventionally spaced vertical studs 16 and 18 of the wall structure.

The cabinet comprises a box 20 that is mounted flush with the outside finished surface 22 of the wall, and a rectangular frame 24 defining opening 26. Door 30 is mounted on the outside of frame 24 to cover opening 26. The door is optional.

Figure 3:
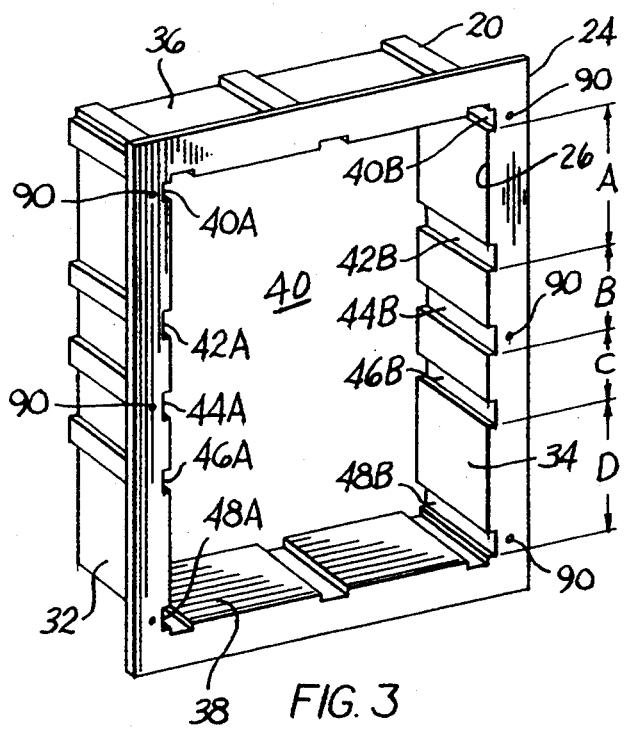
FIG. 3 is a view of a cabinet without shelves.

Referring to FIG. 3, box 20 has a pair of spaced parallel side walls 32 and 34, and a top wall 36 parallel to a bottom wall 38. The top and bottom walls are at right angles to the side walls in a rectangular configuration. Back wall 40 is attached to the rear of the side walls, top and bottom walls.

For illustrative purposes, the distance between the side walls is 13 1/2". The distance between the top and bottom walls is 16 1/4". The depth of the box, perpendicular to the back wall is 4 1/4".

Side walls 32 and 34 have a first pair of opposed horizontal slots 40A and 40B, a second pair of opposed horizontal slots 42A and 42B, a third pair of opposed horizontal slots 44A and 44B; a fourth pair of opposed horizontal slots 46A and 46B and a bottom pair of opposed horizontal slots 48A and 48B. Each of the horizontal slots in the side walls extends the full depth of the box. The slots in both side walls have a common horizontal depth of 1/4".

Referring to FIG. 3, the vertical width of slots 40A and 42B, and 48A and 48B is 1/2". The remaining slots each have a vertical width of 1", to accommodate the thickness of cassette tapes. The vertical distance between slots 40B and 42B, represented by "A" is preferably 4 5/16". The vertical distance between slots 42B and 44B, represented by "B", is preferably 2 13/16".

The vertical distance between horizontal slots 44B and 46B, designated at "C" is preferably 2 13/16"; and the vertical distance between horizontal slots 46B and 48B, designated at "D", is preferably 4 13/16". The vertical distance between the corresponding slots on left side wall 32 is identical to the vertical distances between the slots on right side wall 34 so that the slots are aligned in pairs. These vertical distances are chosen to accommodate the width of conventional audio and video cassette tapes.

Figure 4:
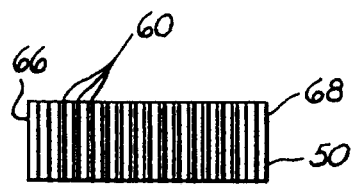
FIG. 4 is a reduced plan view of a typical shelf for supporting audio cassette tapes.
Figure 5:
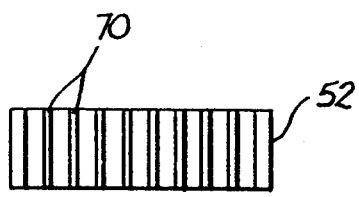
FIG. 5 is a plan view of a typical shelf useful for storing video cassette tapes.
Figure 9:
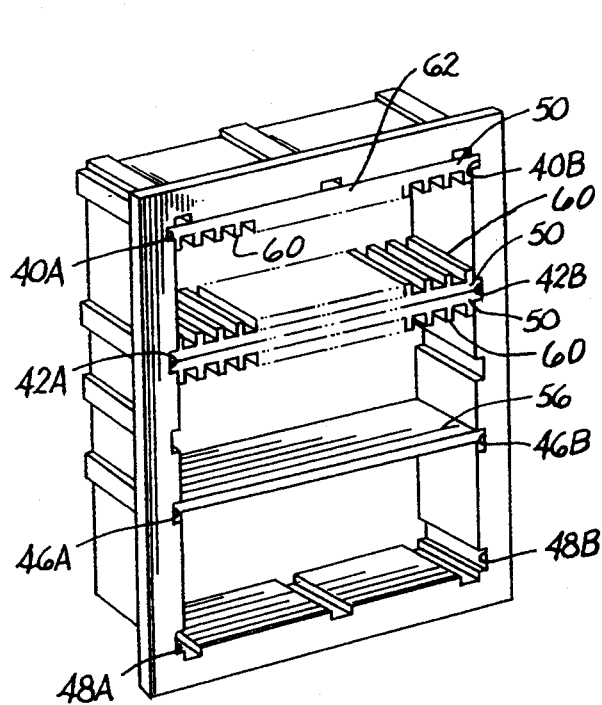
FIG. 9 illustrates the cabinet converted for storing audio cassette tapes as well as other items.

FIGS. 4, 5, and 9 illustrate three types of horizontal shelves 50, 52 and 56 that can be inserted in the slots in the side walls. Shelf 50 illustrates a shelf that can be employed for mounting audio cassette tapes. A typical shelf 50, illustrated in FIG. 4, is flat on one side and has a plurality of parallel ribs generally indicated at 60 on the opposite side. As illustrated in FIGS. 4 and 9, shelf 50 has a body 62 having a thickness, excluding the ribs, of 3/8".

Typical shelf 50 can have its opposite side edges mounted in any pair of opposed horizontal slots in the side walls however, preferably a single shelf is inserted in slots 40A and 40B, as illustrated in FIG. 9, and a pair of shelves 50 are mounted back-to-back in slots 42A and 42B. Another pair of shelves can also have their opposite side edges mounted in slots 46A and 46B, and a single shelf 50 can be mounted in slots 48A and 48B with the ribbed side facing up.

Shelf 50 has 15 parallel ribs 60 that are parallel to the side edges 66 and 68 and form 14 slots. The distance between ribs is 11/16". The ribs have a common height of 1/4". The first rib is spaced 1/4" from the side edge. The ends of the shelves fit their respective slots with the first rib adjacent each end abutting the side walls of the cabinet box. The arrangement is such that when a pair of shelves 50 are mounted in a pair of opposed, horizontal slots of the side walls, the slots between the ribs on each shelf are aligned with the opposing slots on the other shelf in such a manner that a cassette tape can slide into a pair of slots to a position in which it is supported in a upright, vertical position. A pair of cooperating shelves can support 14 cassette tapes.

By mounting a pair of shelves 50 in a back-to-back relationship in slots 46A and 46B, a second group of 14 cassette tapes can be mounted in the box. Similarly by mounting a shelf 50 in bottom slots 48A and 48B, a third group of cassette tapes can be stored in a vertical position in the cabinet for a total of 52 cassette tapes.

On the other hand, a single flat shelf 56 can be mounted in slots 46A and 46B, as illustrated in FIG. 9 so that other items can be stored in the cabinet together with the audio cassette tapes.

FIG. 5 illustrates a typical shelf 52 that can be used for storing video tapes. Shelf 52 has the same width and length as shelf 50. Shelf 52 has side edges that can be received in the slots of the side walls of the cabinet box. Shelf 52 has eleven parallel ribs 70, each pair being spaced a distance of 1 ⅛" and a depth of 5/16" defining 10 slots for receiving the edges of 10 video cassette tapes.

Figure 8:
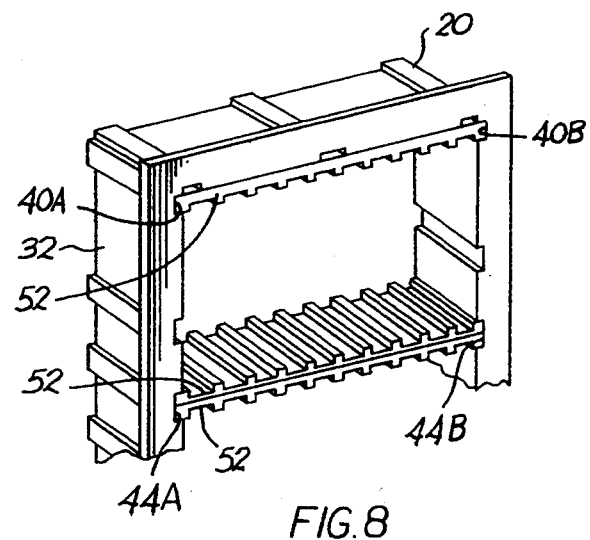
FIG. 8 illustrates the manner in which one of the shelves is employed for mounting video cassette tapes.

Referring to FIG. 8, three shelves 52 are illustrated mounted in slots 40A and 40B, and 44A and 44B. The slots of each pair of opposed shelves are aligned in pairs. The lower pair of shelves are mounted back-to-back. A bottom shelf could be mounted in slots 48A and 48B to store an additional row of video cassette tapes in upright positions, their edges retained in the slots between the ribs.

Figure 10:
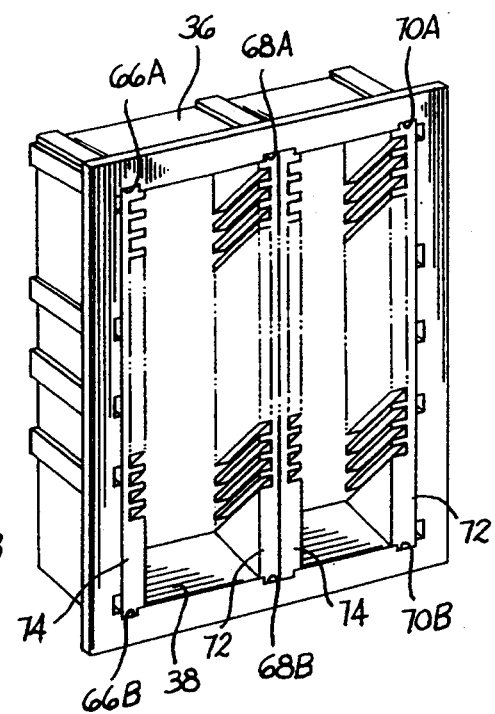
FIG. 10 illustrates the unit employed for storing compact discs.

FIG. 10 illustrates upper wall 36 with three slots 66A, 68A and 70A. Slots 66A and 70A each have a width of ½" while centrally located slot 68 has a width of 1".

The bottom wall has three companion slots 66B, 68B and 70B. Slots 66B and 70B have the same horizontal width as slots 66A and 70A and are directly opposed to the upper slots. Slot 68B has an identical width and depth to that of 68A. All slots in the top and bottom walls extend the full depth of the box.

Figure 6:
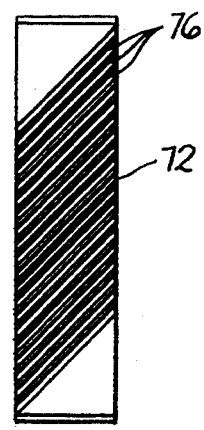
FIG. 6 is an elevational view of a vertical shelf for storing compact discs.

Referring to FIG. 6, shelf 72 is illustrative of a shelf useful for mounting a compact disc. The embodiment illustrated in FIG. 10 has two shelves 72, and another pair of shelves 74 which are identical to shelf 72 except they are a mirror image of shelf 72. The back sides of both shelves 72 and 74 are flat. A single shelf 72 is mounted on the left hand side of slots 68A and 68B, and a single shelf 72 is mounted in slots 70A and 70B. This shelf has the same depth as the cabinet and therefore the same depth as the other shelves.

A pair of shelves 74 are mounted in the cabinet, one being disposed with its upper and lower edges in slots 66A and 66B, respectively, and the other shelf having its upper and lower edges in slots 68A and 68B. Thus the two inner shelves 72 and 74 are back to back with their ribs aligned with the ribs on the outer shelves 74 and 72. The distance between the ribs is ½". The arrangement is such that the side edges of a compact disc will slide between the ribs 76 in shelf 72, and between the corresponding aligned ribs in shelf 74. Twenty slots in each pair of companion shelves 72 and 74 support 20 compact discs. The slots are ½" deep. Preferably the ribs are mounted at about a 45° angle with respect to the slots in the side walls of the cabinet box. This arrangement permits the cabinet box to accommodate audio and video cassettes having a common depth as well as compact discs having a greater depth.

Figure 7:
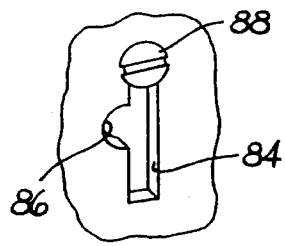
FIG. 7 is a view of a fastener means supporting the door on the cabinet.

The frame opening 26 provides access into the cabinet. Door 30 may have an inner transparent section 82, as illustrated in FIG. 1. Door 30 has several wing-shaped slots 84 as illustrated in FIG. 7. The mid-section of each slot is enlarged at 86 to permit the head of a double-headed fastener 88 to be received into the slot. The cover can then slide down on the fasteners until the cover rests on the neck of each fastener as illustrated in FIG. 7. The cover can be easily removed by raising it until the enlarged mid-section permits the cover to be removed from head 88 of each fastener.

The cabinet and the door are both formed of a molded plastic material and supplied with several interchangeable vertical and horizontal shelves. The user installs the cabinet by first locating the wall studs, insuring that they are a sufficient distance to install the cabinet between them. The wall is marked where the cabinet is to be installed. Opening 12 is cut into the dry wall to the proper size so that the cabinet box will fit. The double headed fasteners 88 are sufficiently long to pass through openings 90 in the frame, see FIG. 3, to anchor the cabinet to the wall. After the cabinet has been installed in the wall, either vertical and/or horizontal shelves are installed depending on the nature of the sound recordings to be stored in the cabinet. The shelves are simply inserted in the proper slots and the unit is then ready for receiving the audio and visual material.

Having described my invention, I claim:

1. A convertible storage cabinet suited for installation between the wall studs of a residential wall for storing sound recordings such as video cassette tapes and audio cassette tapes having a lesser dimension or compact discs having a greater dimension, comprising:

a box having a horizontal top wall, a horizontal bottom wall spaced and parallel with respect to the top wall, and a pair of spaced parallel side walls at right angles to the top and bottom walls, the box having a width suitable for being received between the vertical studs of a residential wall and a peripheral flange attached to said box to define a front access opening;

a first panel having a pair of spaced parallel side edges, a first flat ribless face on one side thereof, and a second face on the opposite side thereof having a plurality of ribs spaced to accommodate the thickness of a sound recording;

said side walls having a first pair of opposed, parallel slots adjacent one of said horizontal walls for removably receiving the side edges of the first panel to support the same in a position in which the flat ribless face thereof is in face-to-face relationship with said one of the horizontal walls and the ribbed second face thereof faces the other of the horizontal walls;

a second panel and a third panel each having a pair of spaced parallel side edges and a flat ribless face on one side thereof, the second panel having a second face on the opposite side of the ribless face thereof having a plurality of ribs spaced to accommodate the thickness of a sound recording; and the side walls of the box having a second pair of opposed parallel slots between the horizontal walls for removably receiving the side edges of both the second panel and the third panel in which their respective flat ribless faces are in a face-to-face relationship and parallel to the horizontal walls and the ribbed face of the second panel faces the ribbed face of the first panel for receiving the side edges of a sound recording.

2. A convertible storage cabinet as defined in claim 1, in which the box has a front opening providing access to the panels and including a door removably mounted on the cabinet over said opening.

3. A storage cabinet as defined in claim 1, and including a fourth panel having a pair of spaced parallel side edges, a first flat ribless face on one side thereof, and a second face on the opposite side thereof having a plurality of ribs spaced to accommodate the thickness of a sound recording;

said side walls having a third pair of opposed parallel slots adjacent the other of the horizontal walls for removably receiving the side edges of the fourth panel to support the same in a position in which the flat ribless face thereof is in face-to-face relationship with the other of the horizontal walls and the ribbed second face thereof faces the third panel.

4. A convertible storage cabinet as defined in claim 3, in which certain of the panels have slots with a width for accommodating the thickness of audio cassette tapes, and the other panels have slots with a width adapted to accommodate the thickness of a compact disc.

5. A convertible storage cabinet as defined in claim 3, in which certain of the panels have a distance between adjacent ribs adapted to receive the edge of a compact disc between the ribs.

6. A storage cabinet as defined in claim 1, including a first vertical panel and a second vertical panel, each having a ribbed face, a ribless face and a pair of spaced parallel side edges, and in which the top wall and the bottom wall have a third pair of opposed parallel slots adjacent one of said side walls for removably receiving the side edges of the first vertical panel when said first, second, and third panels have been removed to support the same such that the ribless face thereof is disposed in face-to-face relationship with said one of the side walls, the top wall and the bottom wall having a fifth pair of opposed parallel slots adjacent the other of the side walls for removably receiving the side edges of the second vertical panel when said first, second, and third panels have been removed such that the ribless face thereof is disposed in face-to-face relationship with the other of said side walls, and the ribbed face thereof facing the first vertical panel for supporting a plurality of side-by-side sound recordings between said first vertical panel and said second vertical panel.

7. A storage cabinet as defined in claim 1, in which the panels each have a uniform edge thickness, the first pair of opposed slots in the side walls having a width for receiving the side edge of an individual one of said panels and the second pair of slots have a larger width for receiving the side edges of a pair of said panels.

8. A convertible storage cabinet suited for installation between the wall studs of a residential wall for storing sound recordings such as video cassette tapes and audio cassette tapes having a lesser dimension or compact discs having a greater dimension, comprising:

a box have a first pair of vertical spaced parallel horizontal walls and a second pair of horizontally spaced parallel vertical walls at right angles to the first pair of walls, the box having a width suitable for being received between the vertical studs of a residential wall and a peripheral flange attached to said box to define a front access opening;

a first panel having a pair of spaced parallel side edges, a first flat ribless face on one side thereof, and a second face on the opposite side thereof having a plurality of ribs spaced to accommodate the thickness of a sound recording.

one of said pair of walls having a first pair of opposed, parallel slots adjacent a first wall of the other of the pair of walls removably receiving the side edges of the first panel to support same in a position in which the flat ribless face thereof is in face-to-face relationship with said first wall of the other of the pair walls;

a second panel and a third panel each having a pair of spaced parallel side edges and a flat ribless face on one side thereof, the second panel having a second face on the opposite side of the ribless face thereof having a plurality of ribs spaced to accommodate the thickness of a sound recording; and said one of said pair of walls of the box having a second pair of opposed parallel slots for removably receiving the side edges of both the second panel and the third panel in which their respective flat ribless faces are in a face-to-face relationship and parallel to said first wall of the other of the pair of walls and the ribbed face of the second panel faces the ribbed face of the first panel for receiving the side edges of a sound recording between them.

* * * * *